United States Statutory Invention Registration [19]

[11] Reg. Number: H798

Brooks [43] Published: Jul. 3, 1990

[54] PHASE SHIFTING APPARATUS AND METHOD FOR SHEARING INFERFEROMETRY

[75] Inventor: Lawrence D. Brooks, Thousand Oaks, Calif.

[73] Assignee: The United States of America as represented by the Secretary of the Army, Washington, D.C.

[21] Appl. No.: 425,085

[22] Filed: Oct. 18, 1989

[51] Int. Cl.[5] ..... G01B 9/02

[52] U.S. Cl. ..... 356/353

*Primary Examiner*—Thomas H. Tarcza
*Assistant Examiner*—Linda L. Wallace
*Attorney, Agent, or Firm*—Freddie M. Bush; James T. Deaton

[57] ABSTRACT

A shearing interferometer, sensor head that combines advantages of standard phase shifting processing with the simplicity of shear plates. In the interferometer sensor head either a conical or a linear x-y scan is used to bring about phase shifting in the resultant interferogram, permitting routine wavefront measurements of laser beams conveniently with a sensor head based on noncomplex optical and electronic components.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PHASE SHIFTING APPARATUS AND METHOD FOR SHEARING INFERFEROMETRY

DEDICATORY CLAUSE

The invention described herein was made in the course of or under a contract or subcontract thereunder with the Government and may be manufactured, used, and licensed by or for the Government for governmental purposes without the payment to me of any royalties thereon.

SUMMARY OF THE INVENTION

In a shearing interferometer, a phase shifting method is employed for obtaining interference patterns of laser wavefront profiles. The method utilizes a conical beam scan or a linear scan to carry out the phase shifting obtained in the shearing interferogram. A rotating thin wedge plate or a single tilt mirror is used to provide the respective conical or linear scans. Shear plates, grating interferometers, prisms or other beam shearing components are used with the respective wedge plate or tilt mirror to direct laser beam intensities to detector arrays to obtain shearing interferograms.

DESCRIPTION OF THE PREFERRED EMBODIMENT

Figure 1:
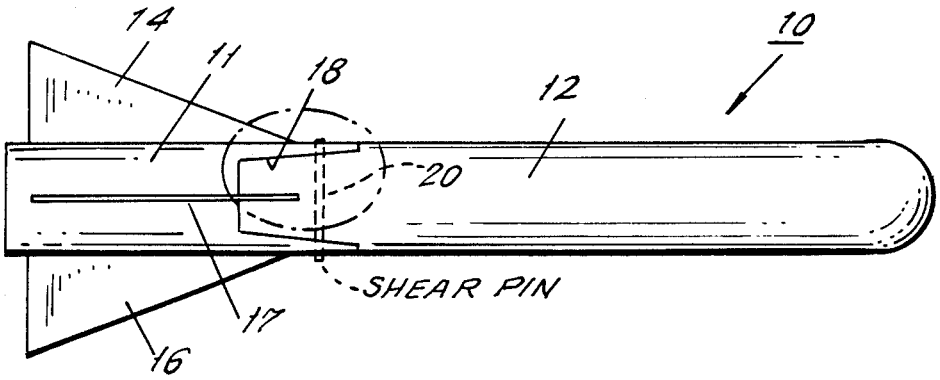
FIG. 1 is a simple schematic of an optical sensor head employing the phase shifting capability.

Referring to the drawings wherein like numbers refer to like parts and wherein extraneous routine circuitry is not shown, FIG. 1 discloses an optical sensor head 10 having a thin wedge plate 12 for receiving an input laser beam and disposed in alignment with shear plates 14 and 16 along a centerline 18. Wedge plate 12 is disposed for rotation around an axis coincident with centerline 18 and provides a conically scanned output beam. The direction of rotation is designated as $\theta$. The respective faces 14A and 16A of shear plates 14 and 16 are both positioned at an angle $\psi$ with respect to centerline 18. As shown, $\psi=45$ degrees but it can be any angle of convenience for directing the reflected beams to detectors. Shear plate 14 is disposed to provide a designated "y" scan and shear plate 16 is disposed to provide a designated "x" scan. Output intensities from the y shear plate 14 are coupled to a detector array 20 and output intensities from the x shear plate 16 are coupled to detector array 22.

In operation, a laser beam of interest is directed from a laser source (not shown) as an input to wedge 12 along centerline 18. Wedge 12 is rotated in the direction $\theta$ to provide the conical scan path. At preselected positions along the path of rotation, $\theta$ the laser beam is directed through wedge 12 and plates 14 and 16. The conical scanned output from wedge 12 has first and second intensity portions thereof reflected from the front and back surfaces 14A and 14B to y detector array 20 as the beam passes through plate 14. Similarly, as the remainder of the beam passes through plate 16 first and second intensity portions are reflected from surfaces 16A and 16B respectively to detector array 22. The remainder of the beam is coupled out of the system and dumped or otherwise used, such as for initial alignment of the sensor head components and detectors. Output signals from the respective detectors 20 and 22 of sensor head 10 are indicative of laser wavefront slope profiles and are coupled to routine processing circuitry for standard reduction procedures in wavefront recovery from slope measurements.

As a laser beam wavelength passes through each shear plate 14 and 16 there is a phase shift, $\Delta$ in the reflected beam intensities from the respective first and second surfaces of each plate. This is due to the change in the optical path distance from the wedge to the respective first and second surfaces of each plate.

The optical sensor head 10 is compact, allowing routine wavefront measurements to be made conveniently with noncomplex optical and electronic components. Routine processing circuitry (not shown) such as a simple table-top computer, process the received interference patterns from detectors 20 and 22 and process these patterns according to standard practices for wavefront recovery from slope measurements.

Rotation of wedge plate 12 generates the conical scan for the two shear plates as noted hereinabove. As the wedges turn and angle $\theta$ the y tilt angle introduced is $\beta=-[(n-1)\gamma]\cos\theta$ and the x tilt angle introduced is u $\alpha=-[(n-1)\gamma]\sin\theta$ where n is the wedge index and $\gamma$ is the wedge angle. As a result of the tilts the phase shift $\Delta$ takes place in the shearing interferograms of an amount $$\Delta_x=S\alpha$$

$$\Delta_y=S\beta$$

where S=shear distance.

The two-dimensional array of discrete detectors, 20 and 22, read out intensity values at preselected rotation angles $\theta$ corresponding to specific phase shift amounts. For a four bucket technique (4 samples for each 360 degrees of rotation), the phase shifts are 0°, $\lambda/4$, $\lambda/2$, and $3\lambda/4$, and the measured phase (the x-derivative of the wavefront under test) at the x-shear detector is $$\phi_x = \tan^{-1}\frac{D-B}{A-C}$$

where $$A=I_1+I_2+2\sqrt{I_1 I_2}\cos\phi$$
$$B=I_1+I_2+2\sqrt{I_1 I_2}\cos(\phi+\pi/2)$$
$$C=I_1+I_2+2\sqrt{\cos}(\phi+\pi)$$
$$D=I_1+I_2+2\sqrt{\cos}(\phi+3\pi/2)$$

and $I_1$, $I_2$, are the intensities of the x-sheared wavefronts. Similar expressions exist for the corresponding detector 20 of the y-shear pattern. If desired, a 3-bucket reduction process could be used instead (3 samples for each 360 degrees of rotation of $\theta$ at 0°, 120°, and 240°). Also, if a CCD integrating photodiode array were used, or electronic integration techniques were employed, an integrating bucket technique can be used. Alternatively standard heterodyne signals can simply be generated by insuring that $$(\Delta_x)_{max}=(\Delta_y)_{max}=1\lambda,$$

since in the heterodyne case, a continuous sinusoidal signal would come from each detector element. The rotating wedge conical scan works because (except for a negligible translation with small tilts) the x-shear interferogram is insensitive to the y tilt, and vice-versa. That is because the shearing interferogram is essentially a one-dimensional derivative of the two-dimensional wavefront.

Figure 2:
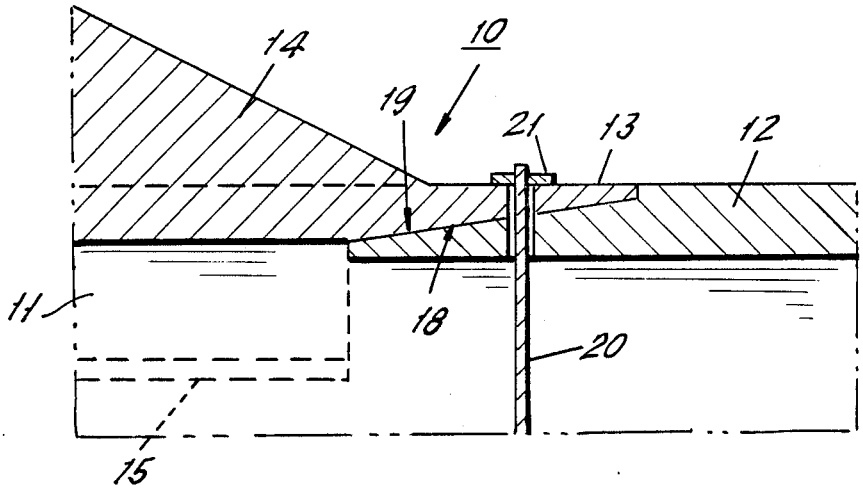
FIG. 2 is an alternative configuration using a single tilt mirror in the system of FIG. 1.
Figure 3:
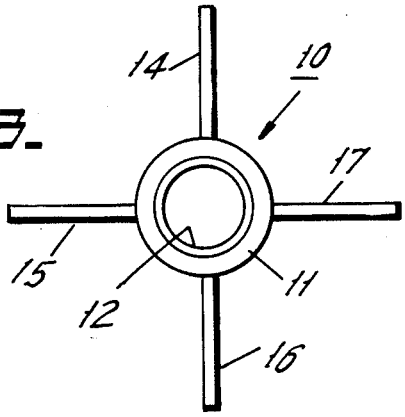

In an alternate configuration, a single tilt mirror can be used to introduce an x=y (45°) linear scan instead of the conical scan of the wedge. This embodiment is shown partially in FIG. 2 wherein mirror 32 replaces wedge 12 in the optical path. The plane or face of mirror 32 is positioned at an angle, such as 45 degrees, to centerline 18. Oscillation or dithering of mirror 12, allows an input beam to be varied or repositioned along the optical path 18 to provide the phase shifting.

This method is applicable to virtually every wavefront determination task for a continuous wave laser. In addition to use in the laboratory for alignment and component testing applications, it can also be used for the measurement of high-energy laser beam samples.

Random jitter of the input beam can be readily compensated for by routine procedures. For example, for S=1 millimeter and $\lambda=0.5$ microns, a $\lambda/4$ phase shift requires a tilt of 125 microradians, a relatively large amount of tilt for most optical setups of interest. High speed deflection procedures will also reduce the effect of jitter.

Although the present invention has been described with reference to a preferred embodiment, workers skilled in the art will recognize that changes may be made in the form and detail without departing from the scope and spirit of the foregoing disclosure. Accordingly, the scope of the invention should be limited only by the claims appended hereto.

I claim:

1. An optical sensor head for a shearing interferometer comprising: beam directing means and first and second shear plates disposed in alignment for coupling a laser beam therethrough, said beam directing means being disposed to receive a laser beam input and direct the beam toward said first shear plate, said first shear plate having first and second surfaces for reflecting first and second beam portions and coupling a third beam portion therethrough, said second shear plate having first and second surfaces for reflecting fourth and fifth beam portions and coupling a sixth portion therethrough.

2. An optical sensor head for a shearing interferometer as set forth in claim 1 wherein said beam directing means is a wedge plate disposed for rotation to generate a conical scan.

3. An optical sensor head for a shearing interferometer as set forth in claim 2 and further comprising first and second detector arrays, said first detector array being aligned with said first shear plate to receive incident laser beam intensity from said first and second surfaces of said first shear plate, and said second detector array being aligned with said second shear plates to receive incident laser beam intensity from said first and second surface of said second shear plate.

4. An optical sensor head for a shearing interferometer as set forth in claim 1 wherein said beam directing means is a mirror.

5. An optical sensor head for a shearing interferometer as set forth in claim 4 and further comprising first and second detector arrays, said first detector array being aligned with said first shear plate to receive incident laser beam intensity from said first and second surfaces of said first shear plate, and said second detector array being aligned with said second shear plate to receive incident laser beam intensity from said first and second surfaces of said second shear plate.

6. In a shearing interferometer, a phase shifting method that provides beam intensity values indicative of laser wavefront slope profiles comprising the steps of:

directing a laser beam along an optical path, rotating a wedge plate within said optical path to conically scan said laser beam, directing the conically scanned laser beam to respective first and second shear plates angularly disposed in the beam path to provide a phase shifted output reflection, reflecting first and second cross-sectional portions of said conically scanned laser beam from each of said shear plates, and detecting said reflected cross-sectional portions of laser beam for providing said beam intensity values.

7. In a shearing interferometer, a phase shifting method that provides beam intensity values indicative of laser wavefront slope profiles comprising the steps of:

directing a laser beam along an optical path, rotating a linear scan mirror within said optical path to conically scan said laser beam, directing the conically scanned laser beam to respective first and second shear plates angularly disposed in the beam path to provide a phase shifted output reflection, reflecting first and second cross-sectional portions of said conically scanned laser beam from each of said shear plates, and detecting said reflected cross-sectional portions of laser beam for providing said beam intensity values.

* * * * *